United States Patent
Bedell

[15] 3,662,802
[45] May 16, 1972

[54] HYDRAZINE PERCHLORATE LITHIUM PERCHLORATE EUTECTICS

[72] Inventor: Stanley F. Bedell, Andover, Mass.

[73] Assignee: Monsanto Research Corporation, St. Louis, Mo.

[22] Filed: July 2, 1962

[21] Appl. No.: 207,460

[52] U.S. Cl..................................149/36, 149/19, 149/75, 23/85
[51] Int. Cl..........................................C06d 5/00, C06d 5/06
[58] Field of Search....................149/109, 19, 83, 36, 20, 75; 23/85

[56] References Cited

UNITED STATES PATENTS

| | | | |
|---|---|---|---|
| 2,858,188 | 10/1958 | Haller | 23/85 |
| 2,929,680 | 3/1960 | Stein | 23/85 |
| 3,031,289 | 4/1962 | Phillipson | 149/109 |
| 2,406,572 | 8/1946 | Vogl | 149/109 |

*Primary Examiner*—Benjamin R. Padgett
*Attorney*—R. M. Dickey, L. A. Ferris and M. B. Moshier

EXEMPLARY CLAIM

1. A hydrazine perchlorate/lithium perchlorate eutectic, molar ratio of hydrazine perchlorate to lithium perchlorate selected from 1:1 and 1:2.

3 Claims, No Drawings

HYDRAZINE PERCHLORATE LITHIUM PERCHLORATE EUTECTICS

This invention relates to novel perchlorate materials and more particularly, provides novel eutectics of hydrazine perchlorate and lithium perchlorate, novel compositions comprising the said eutectics and novel methods of making the same.

Hydrazine perchlorate is a desirable high energy oxidizer for solid propellants. However, it has a sensitivity to impact like that of lead azide — about 3 to 6 cm, 50 percent probability height (2 kilogram weight, standard Bureau of Mines impact test apparatus).

It is an object of this invention to provide a novel product comprising hydrazine perchlorate of reduced sensitivity.

Another object is to provide novel compositions comprising solid propellants containing hydrazine perchlorate and having reduced sensitivity to impact.

A still further object is to provide a novel method of preparing a propellant composition including hydrazine perchlorate.

These and other objects will become evident from a consideration of the following specification and claims.

It has now been found that hydrazine perchlorate and lithium perchlorate form two eutectics at the ratios of 1:1 and 1:2 hydrazine perchlorate/lithium perchlorate. Comparison of impact sensitivity measurements of the eutectic and simple mechanical mixtures of the two constituents demonstrates the greatly reduced sensitivity of the eutectics.

| Hydrazine Perchlorate/ Lithium perchlorate Weight % | Impact Sensitivity, cm (50 % Probability, 2 kg Weight) |
|---|---|
| 38.4/61.6   physical mixture (1:2 molar ratio) | 21.6 |
| 38.4/61.6 fused eutectic | 51.2 |
| 55.46/44.5 4 physical mixture (1:1 molar ratio) | 9.9 |
| 55.46/44.54 fused eutectic | 26.3 |

The use of lithium perchlorate in an amount less than that required to form the 1:1 molar ratio eutectic appears to have little effect on the impact sensitivity of hydrazine perchlorate. A mixture of hydrazine perchlorate and lithium perchlorate in a 77/23 weight ratio, prepared in the same manner as the eutectic, detonates violently when subjected to a slight crushing force in a mortar and pestle.

Two methods are available for the preparation of the stated eutectics: (1) fusion, and (2) solvent system. The fusion method comprises heating a mixture of substantially anhydrous hydrazine perchlorate with substantially anhydrous lithium perchlorate, wherein said perchlorates are present in a molar ratio of from about 1:1 to about 1:2, to a temperature above the melting points of said perchlorates.

The solvent system method comprises evaporating a solution of hydrazine perchlorate and lithium perchlorate in a 1:1 or 1:2 molar ratio in an organic solvent to dryness. As further set forth in copending application Ser. No. 207,472 filed concurrently herewith by Joseph J. Byrne, it is found that, with an organic solvent such as isopropyl or ethyl alcohol, which can be removed by evaporation without requiring the use of elevated temperatures, cooling the solution to produce precipitation does not produce separation of the eutectic composition: the precipitate is high in hydrazine. However, the evaporation technique produces a eutectic having an X-ray diffraction pattern identical with that of the same eutectic made by the fusion technique.

The novel eutectics of this invention can be employed advantageously for making solid propellant compositions. These may be of the conventional composite propellant type, consisting of an inorganic oxidant and a polymeric binder, which latter also serves as the reductant-fuel of the system. One of the most commonly used inorganic oxidants in such compositions is ammonium perchlorate. Employing a eutectic as presently provided as the inorganic oxidant in a conventional composite propellant composition affords several advantages.

The heat of formation of the 1:1 eutectic is about 5 kilocalories more positive than ammonium perchlorate when compared on a 100 gram basis. Furthermore, besides the higher energy that it thus possesses, it has a higher density: 2.126 g/cc (theoretical 2.127 g/cc).

Still more advantageously, the presently provided novel eutectics may be employed to produce polymeric solid solution compositions wherein the polymer and perchlorate are combined in the same homogeneous phase. Conventional composite solid propellant compositions are heterogeneous compositions wherein the burning rate and stability to detonation are dependent to some extent on the particle size of the oxidant. The former property is improved as the particle size of the oxidant is reduced, but milling to provide a finely divided oxidant is hazardous and periodic explosions are encountered.

Dissolving the oxidant in the binder provides the oxidant in a state of subdivision finer than any grinding can produce, and avoids the hazards of milling.

Putting the oxidant into the same phase as the binder also raises the available solids loading of the composition. There is a limit to the solids loading for a given amount of binder, above which not enough binder will be available to form a continuous phase binding the discontinuous solids phase into a unitary structure. In the conventional composite propellant, the solids phase includes oxidant for the binder. To the extent that the binder phase includes oxidant for itself, available solid loadings is freed for inclusion of other energetic components.

It has previously been discovered that a variety of polymeric materials can form polymeric solid solutions of lithium perchlorate, wherein the polymer and perchlorate are combined in one homogeneous phase. The perchlorate dissolves in the polymeric binder to an extent providing more oxygen can then be used to raise the specific impulse of these compositions by inclusion of the additional oxidizable energetic propellant components such as a combustible light metal. The presently employed eutectic will dissolve in polymeric binders in an amount considerably greater than the solubility of lithium perchlorate alone permits, so that the products of the present invention can contain very high percentages of dissolved oxidant which is available for the oxidation of energy sources besides the polymeric binder.

The solubility of the presently provided eutectic in polymerizable monomers is suprisingly high: for example, ethanolamine will dissolve 35 times its own weight of the 1:1 molar ratio eutectic at below 100° C. The ethanolamine containing the dissolved eutectic can then be polymerized by reaction with a second polyfunctional monomer such as a diisocyanate, to provide a polymeric solid solution wherein the polymer and perchlorate are combined in the same homogeneous phase.

Thus an advantageous method of preparing a propellant composition in accordance with the present invention comprises polymerization of a polymerizable monomer in the presence of dissolved hydrazine perchlorate/lithium perchlorate eutectic. As will appear hereinafter, such polymerizable monomers include both self-polymerizing monomers such as an olefin capable of addition polymerization like acrylamide, and monomers polymerizable to a condensation polymer such as systems of polyfunctional inter-reactive monomers like the ethanolamine and diisocyanate above mentioned.

Referring now in more detail to the nature of the presently provided methods and products, the presently provided novel compounds are referred to herein as eutectics. By this is meant a eutectic mixture, as distinguished from a gross physical mixture of the eutectic components. In these eutectics, the individual perchlorates are intimately associated, by virtue of the isolation of the eutectic from a fluid (melt or solvent) in which the individual perchlorates have been combined in the eutectic ratio. The eutectics have characteristic X-ray diffraction patterns, by which they may be distinguished from gross physical mixtures of the eutectic components in the eutectic ratio. The specific compositions of the eutectics provided by this invention are those of the 1:1 and the 1:2 hydrazine perchlorate: lithium perchlorate molar ratio.

For the preparation of the stated eutectics by fusion, as above mentioned, it is important that the individual perchlorates employed for the preparation be substantially anhydrous. Lithium perchlorate can be dehydrated by known methods, such as simply heating in vacuum, for example. Hydrazine perchlorate is highly impact sensitive, and drying it by heating may be hazardous. However, it nevertheless can be handled with safety by a convenient process described in co-pending application Ser. No. 207,472 filed concurrently herewith by Joseph J. Byrne.

Briefly, this consists in forming the anhydrous perchlorate in an organic solvent by reaction of a salt of hydrazine with an inorganic perchlorate. The hydrazine perchlorate is precipitated from the solvent by cooling, and separated from it by filtration. The hydrazine perchlorate separated from the organic solvent system, which is anhydrous, is then maintained wet with solvent during its handling. While the hydrazine perchlorate is wet with solvent, it has been found, the sensitivity is greatly reduced: for example, crystals of hydrazine perchlorate wet with isopropyl alcohol, immediately after separation from the alcohol by filtering, have an impact sensitivity of 90–100 cm. Drying to remove all the alcohol reduces the impact sensitivity to the value of 6 cm.

The substantially anhydrous lithium perchlorate and hydrazine perchlorate will be combined in about the ratio selected for the eutectic to be prepared, the 1:1 molar ratio or the 1:2 molar ratio, and heated to fuse them. The physical mixture melts at about 140° C, just below the melting point of free, dry hydrazine perchlorate, which is 142°–143° C. Usual standard techniques for safe handling of explosive mixtures will be observed in fusing the perchlorate to form the eutectic, as the alcohol wetting the hydrazine salt evaporates off during the fusion. The fusion product, however, has the impact values of from 26 to 51 cm mentioned above, rather than the 6 cm sensitivity of hydrazine perchlorate.

When the solvent system method is used to prepare the presently provided eutectics, the anhydrous hydrazine perchlorate need never be freed of organic solvent.

In conducting the solvent method, the hydrazine perchlorate is prepared, as above described, by reaction in an anhydrous organic solvent system, and then while still wet with or in solution in organic solvent, associated with the required amount of lithium perchlorate to form the desired 1:1 or 1:2 molar ratio eutectic. The two perchlorates will be associated, in conducting this method, in solution in an organic solvent. Such solvent should be one in which each of the perchlorates will dissolve to a fairly substantial degree, such as at least about 5 grams per 100 milliliters (ml). Further, the solvent ought to be one which is fairly low boiling, such as one which boils below about 100° C, and preferably below about 50° C. Particularly suitable solvents are alcohols, such as ethyl alcohol and isopropyl alcohol. If desired, other polar solvents such as dimethylformamide or dimethylsulfoxide may be employed; also useful are ketones such as acetone, methyl ethyl ketone and the like, and ethers such as the dimethyl ether of ethylene glycol, the dimethyl ether of diethylene glycol, and the like. The eutectic is obtained by evaporating the solution to dryness at low temperatures. Suitably low temperatures are temperatures below 100° C, and preferably ambient temperatures. Evaporation of the solvent at a rapid rate at ambient temperature will generally be produced by exposing the system to reduced pressure, such as a vacuum of 50 millimeters (mm) Hg or below.

Novel compositions provided by this invention comprise a polymer and a novel hydrazine perchlorate/lithium perchlorate eutectic as presently provided. Such compositions are monopropellants which can be employed to produce propellant gases for rockets and the like by burning, and explosive forces on ignition in an enclosed space.

The polymer in the presently provided compositions is present as a polymeric binder, by which is meant a matrix comprising polymer having a molecular weight at least sufficient to make the polymer solid at room temperature. It is undesirable to have a molecular weight so high that the polymer is unfusible and insoluble. Preferably the ultimate product will be sufficiently elastomeric to have a tensile strength of at least 50 pounds per square inch (psi) and ultimate elongation (at break) of at least 20 percent.

In the novel compositions of this invention, the polymer will be combined with an oxidant amount of the eutectic of hydrazine perchlorate and lithium perchlorate, and in the polymeric solid solutions of the invention, at least an oxidant amount of the eutectic will be dissolved in the polymer and combined with the polymer in the same homogeneous phase.

By an oxidant amount is meant enough to supply the combustion oxidation requirements of a significant portion, at least about one-half the oxidation requirements, of the polymer. Thus referring for example to oxidation of polymers including $CH_2$ units, if the C atoms form CO and hydrogen atoms form water, respectively, as gaseous oxidation products, the oxidation requirement is one mole of oxygen per mole of methylene units so oxidized. Under certain conditions, the hydrogen is not oxidized, or is oxidized in part but a corresponding amount of a metal is, so the oxidation requirements of the composition remain about the same.

As will be appreciated, which eutectic is used and how much of the oxygen in the hydrazine perchlorate salt is being consumed to oxidize the hydrazine part of the molecule will affect the amount of oxygen released per mole of eutectic. Thus the ratio of perchlorate to polymer needed to supply the oxidation requirements will vary, but in any case, to obtain benefits of this invention, at least half of this oxidation requirement is supplied by the perchlorate eutectic.

Preferably, all the oxygen requirement for oxidation of the polymer will be supplied by the perchlorate eutectic and still more preferably, more than half and desirably all the oxygen requirement of the total composition is supplied by such perchlorate.

While the present composition may consist essentially or entirely of the polymer and perchlorate eutectic, such composition being useful as a monopropellant and fuel, it is often desirable to include other components in these compositions. These may include fuels and oxidants, as further pointed out hereinafter. If these other components are fuels, they consume oxygen, and thus increase the total oxygen requirement of the composition. Where additional oxidant is included, the perchlorate eutectic need not supply all the oxidant requirements of the composition, but to adapt the composition for propellant and fuel use, it is necessary that the composition include sufficient total oxidant to render combustion of the system self-supporting.

The quantity of perchlorate eutectic desired in the final solid propellant composition will thus vary depending on the particular selection of ingredients. It may be up to from about 70 to about 80 percent of perchlorate eutectic based on the total weight of the composition. It will be understood that substantially smaller amounts of the perchlorate eutectic may be employed in effective compositions, and the amounts are often in the region of from 4 or 5 percent to 15 or 16 percent.

The kind of polymers which may be present in the compositions of this invention as broadly defined above, include any of the various polymeric binders used in solid propellants. For example, they include hydrocarbon polymers such as the butadiene-styrene rubbers, the isoprene polymers, natural rubber, rubbery isotactic polymers such as polymers of propylene and the like. Further, they include other hydrocarbon polymers not generally classified as rubbers such as polyethylene, polystyrene and similar hydrocarbon polymers. Additionally, the products of this invention may be prepared from non-hydrocarbon polymers, such as halogenated polymers like polyvinyl chloride, polyvinylidene chloride, fluorinated polymers such as a polymer of vinylidene fluoride or of a chloro or fluoro ethylene, and so forth. Other useful polymers are polymers characterized by repetitive units including a donor atom selected from the class consisting of O, S, and N. The latter are polymers capable of forming a solid solution product as provided hereby, and illustrative thereof are the polymers that are named hereinafter as useful in preparing such solid solutions.

Methods of combining the perchlorate eutectic with polymer, in the presence or absence of other materials, to form the novel compositions of this invention include, first, the preparation of a composite propellant system, which will be a heterogeneous two-phase system in which the polymer is in a separate phase from the perchlorate eutectic. Such a composition can be prepared by methods conventional in the propellant art, such as milling the polymer with the perchlorate.

More preferably, the compositions provided in accordance with this invention will be polymeric solid solutions of the perchlorate eutectic wherein the polymer and perchlorate are combined in the same homogeneous phase. Such compositions can be made by polymerizing a polymerizable monomer in the presence of dissolved perchlorate eutectic.

By solid solution is meant that the perchlorate and the polymer are homogeneously mixed and in the same phase, to the extent that heterogeneity therebetween is not evident on examination under an ocular microscope.

In conducting the method of invention, the perchlorate eutectic will be dissolved in a polymerizable monomer system. Useful polymerization systems in the present method are each characterized by formation of polymer from monomer in the absence of water. Water unfavorably depresses the solubility of the perchlorate.

The several types of polymerization systems which are particularly contemplated herein can be briefly described as (1) addition polymerization; (2) condensation polymerization of two reactive polyfunctional monomers; (3) self-condensation of a single monomer. In each case the useful monomers are characterized by inclusion of a hetero donor atom such as O, S, or N.

The addition polymerization embodiment of this invention employs as the polymerizable monomer an olefin containing a hetero donor atom selected from O, S and N. Polymers containing carbonamide groups are preferred as the polymeric binder in the compositions of this invention, and accordingly a preferred olefin type is an olefinic carbonamide. For example, they may be polymers of acrylamide, of C-alkylated acrylamides such as methacrylamide, or of N-alkylated and C- and N-alkylated acrylamides such as N-methylacrylamide, N-tert-butylacrylamide, N-tert-octylacrylamide, N,N-dimethylacrylamide, N,N-dipropyl-acrylamide, N-octylmethacrylamide, N-decylmethacrylamide and the like.

They also may be polymers of cyclic amides including polymerizable olefinic unsaturation, the polymers of which are formed by addition polymerization, such as 1-vinyl-2-pyrrolidinone, 3-methyl-1-vinyl-2-pyrrolidinone, and the like.

They also may be polymers of other olefinic amides, such as 3-butenoic amide.

Still another group of polymers which may form the polymeric component of the present novel products are those made by addition polymerization of an olefinic amide having in a side chain a substituent including a hetero atom (polyvalent atom other than C) selected from the group consisting of O, S and N. References herein to "an" acrylamide are intended to include both those in which the only non-hydrocarbon component is the carbonamide side chain group and those including hetero atoms of the type just stated. Illustrative of such amides are, for example, oxy compounds including hydroxy amides such as N-methylolacrylamide, N-(2-hydroxy-ethyl)acrylamide, 2-methylolacrylamide and the like and ether amides such as N-acrylylmorpholine, N-methacrylylmorpholine and N-(2-ethoxyethyl)acrylamide and so forth. The S-containing amides may be illustrated by N-(mercaptomethyl)acrylamide, 2-(2-ethylthioethyl)acrylamide and N-(tetrahydrothienyl)-acrylamide. Illustrative of the N-containing amides are acrylic hydrazide, N-acrylylpiperazine, 2-(aminomethyl)acryl-amide, 1-cyanoacrylamide, N-(trinitroethyl)acrylamide and the like.

The polymers in products of this invention can also be obtained from olefinic monomers susceptible to addition polymerization which are free of carbonamide bonds. Those containing O are illustrated by ethers, such as 1-methoxybutadiene polymers; by polymers containing OH groups such as polymers of allyl alcohol; and by polymers derived from an olefin containing both O and OH such as vinyloxyethanol.

Another group containing O which may characterize presently useful polymers is oxo, rather than the oxy groups shown above. For example, this may be keto, as in methyl vinyl ketone.

Even more desirably, it will be a carboxylate group such as an ester group. Useful esters include as a first class the polymers of olefinic esters. Either the alcohol or the acid portion may be the olefinic group. Illustrative esters include those in which the acid portion of the molecule is unsaturated such as acrylates like methyl acrylate, tert-butyl acrylate, hexyl acrylate, and decyl acrylate, methacrylates such as methyl methacrylate, ethyl methacrylate, N-butyl methacrylate and the like. Illustrative of some esters in which the alcohol-derived portion of the molecule is unsaturated are allyl esters such as allyl acetate, and vinyl esters such as vinyl formate, vinyl acetate and vinyl stearate.

Alternatively, the polymer may contain carboxylic radicals as derived from olefinic acids and anhydrides. Useful acids include methacrylic and acrylic acid. Anhydrides such as maleic anhydride may also be used.

Coming now to S-containing polymers, illustrative of these are the polymers of olefins such as vinyl methyl sulfide.

Referring to the N-containing polymers, those wherein N is amine nitrogen are illustrated by polymers of allyl amine, vinylpyridine, and the like. Acrylonitrile provides a polymer illustrating the type wherein the donor N atom is in a cyano group.

There is no objection to combining several characterizing groups in a single molecule providing the repeating unit in a polymer as contemplated hereby, and indeed, this may be particularly advantageous. For example, polymers of esters of O-containing alcohols may provide both oxy and oxo oxygen, such as 2-methoxyethyl acrylate, 2-methoxyethyl methacrylate, ethylene glycol dimethacrylate, the methacrylate ester of a polyethylene glycol containing, say, nine ethyleneoxy units, and so forth. Or the alcohol may contain amino N such as butylaminoethyl methacrylate, N,N-dimethylaminoethyl methacrylate and the like.

Mixtures of monomeric compounds such as those above mentioned may have solvent power for perchlorate which is substantially greater than either of the compounds alone. Thus useful mixtures of such vinyl monomers include for example, acrylamide-2-methoxyethyl acrylate, acrylamide-vinyloxyethanol, acrylamide-acrylonitrile, acrylamide-allyl acetate, acrylamide-vinyl formate, and so forth. Generally, mixtures in the ratio of about 1:1 mole are found advantageous, but other proportions of the vinylic monomers may be employed if desired. It is to be understood that a copolymer is to be regarded as a polymer of a particular monomer if it contains enough of the monomer to confer characteristics of the homopolymer on the copolymer: for example, references to a polyacrylamide herein are intended to include copolymers in which at least 30 mole-percent of polymerized olefinic monomer is acrylamide.

Especially where the selected monomer is an N-alkylated acrylamide, which does not cross-link in polymerization as does acrylamide, it is sometimes advantageous to include a small proportion of a cross-linking monomer such as acrylamide or methylene diacrylamide in the mix. Proportions such as from 0.01 to 0.10 mole of the cross-linking monomer to 1.0 mole of the non-cross-linking monomer are useful in this connection, to improve toughness and the like.

Polymerization of an olefinic monomer in the presence of dissolved perchlorate eutectic in accordance with this invention may or may not require more than simple heating of the olefinic monomer in the presence of the dissolved perchlorate eutectic. In some cases, the perchlorate eutectic may act as a polymerization catalyst. Indeed, when an oxidant amount of the perchlorate eutectic is dissolved in the olefinic monomer system, as contemplated herein, it is possible that the catalytic effect of the perchlorate eutectic on the polymerization monomer may be greater than desired: the polymer may set up before the mass can be poured and shaped. Various other components of the solution comprising the vinyl monomer and the perchlorate eutectic can also affect its polymerization. For example, an amine may inhibit it. However, while cationic catalysts such as the perchlorate may not be able to effect polymerization in the presence of an amine, free radical polymerization of the olefins generally occurs readily. Thus addition of free radical polymerization catalysts such as benzoyl peroxide, cumene hydroperoxide, diazo isobutyronitrile and the like may be used to produce polymerization.

Another useful approach to effecting the polymerization where a monomer polymerized by the catalytic effect of the perchlorate eutectic is employed is to include a polymerization inhibitor such as an amine in the reaction mixture, and after accomplishing solution of the lithium perchlorate in the monomer-containing mixture and through mixture of the components, quickly mix in a reagent which neutralizes the inhibitor, cast or extrude to shape and allow polymerization to a solid to occur.

The essential components of the polymerization mixture are the dissolved perchlorate, the olefinic monomer having a donor atom selected from O, S and N, and also catalyst where the perchlorate is not itself the catalyst. As will become evident hereinafter, the mix may also contain other components, and conditions for polymerization may be varied depending on what these are. In general, polymerization may be effected at temperatures ranging from 0° C and below up to any temperature below decomposition temperatures of reaction mixture components. Where heating does not have to be avoided because of the presence of sensitive ingredients, it is usually desirable to heat the reaction mixture to promote fluidity of the mix and solubility of the perchlorate. An advantage of the present method is that it is usually possible to effect polymerization at conveniently rapid rates while staying at relatively low temperatures such as between 50° and 100° C.

Usually polymerization is effected simply by maintaining the monomer in contact with active catalyst at suitable temperatures. If desired, variation of pressure from atmospheric — for example, down to 0.1 mm Hg, or up to 5,000 psi — may be employed. Solvents and diluents, such as plasticizers and the like, discussed, in more detail below, may be present.

Proceeding now to consideration of the second type of polymerization useful in the method of this invention, this consists in forming a condensation polymer by polymerizing a first polyfunctional monomer with a second polyfunctional monomer reactive therewith to form a polymer without evolution of water, in the presence of dissolved perchlorate eutectic.

The stated first polyfunctional monomer will have active hydrogen functional groups. These monomers include polyhydroxylic alcohols, polyamines, and amino alcohols. It is found that such active hydrogen polyfunctional compounds, and particularly the polyamines, have a quite spectacular solvent power for lithium perchlorate/ammonium perchlorate eutectic. For example, trimethylenediamine will dissolve 13 times its own weight of the eutectic. Further, these active hydrogen polyfunctional compounds can be polymerized in the presence of dissolved perchlorate eutectic by condensation with other polyfunctional monomers to form the polymeric solid solution of the perchlorate eutectic wherein the polymer and the perchlorate are combined in the same homogeneous phase.

A preferred type of polymers in the novel products of this invention which can be made by this embodiment of the method of the invention, are polymers in which the repeating units are carbon atom chains linked by complex amidic groups as bonds therebetween. The stated carbon atom chains will in many cases be hydrocarbon chains, such as alkylene and arylene units, but are not limited thereto: they may be substituted by non-interfering substituents, or interrupted by hetero atoms such as O, S or the like. The invention includes, for example, products in which the polymer is a polyurethane, polyurea, a polyester/amide and the like.

Of presently useful active hydrogen polyfunctional monomers, the polyhydroxylic alcohols are illustrated by ethylene glycol, trimethylene glycol, tetramethylene glycol, pentamethylene glycol, hexamethylene glycol, heptamethylene glycol, octamethylene glycol, nonamethylene glycol, decamethylene glycol, dodecamethylene glycol, neopentyl glycol, glycerol, pentaerythritol, 2,5-hexanediol, and the like which preferably contain up to about 12 carbon atoms. Also polyether glycols such as the polyethylene glycols, polypropylene glycols and the polybutylene glycols have been found to be suitable solvents for the lithium perchlorate. The lower members of the series are generally preferred, but polyether glycols having a molecular weight of up to about 9,000 have been found to be suitable. As will appear hereinafter, hetero atoms besides ether oxygen, including for example amino nitrogen, may also interrupt the carbon chain in the useful polyhydroxy compounds.

In general, the useful polyhydric alcohols are aliphatic alkanols, and usually will comprise a diol in major proportions, to obviate the high degree of cross-linking produced by triols and higher functional alcohols. It is preferred that the polyhydroxy compounds be polyfunctional primary glycols, but secondary and tertiary glycols have also been found to be suitable.

Presently useful polyamines are also preferably aliphatic diamines such as ethylenediamine, trimethylenediamine, tetramethylenediamine, hexamethylenediamine, pentamethylenediamine, octamethylenediamine, decamethylenediamine, 3-methylhexamethylenediamine and the like. A primary amine group is apt to be active and it is sometimes desirable to employ amines having nitrogen substituents to moderate the vigor of the polymerization reaction. Thus for example, a secondary amine such as N-methylethylenediamine, N-methyltrimethylene diamine, N-butylethylenediamine, N,N'-dimethylhexamethylenediamine and the like may be employed as reactants. Aromatic, cycloaliphatic and like polyamines are also useful in the practice of this invention. For example, illustrative polyamines which may be employed in the present method include p-tolylene diamine, m-phenylenediamine, cyclohexylenediamine and the like.

Other examples of presently useful polyamines are those including hetero atoms in the polymer chain such as 2,2'-diaminoethyl ether and sulfide, the bis(glycine) ester of ethylene glycol, and so forth.

Generally diamines in which each nitrogen atom has active hydrogen as a substituent will tend to produce cross-linking, and thus compounds such as diethylene triamine and dipropylene triamine will be employed in minor amounts, in conjunction with diamines, in the practice of this invention.

The term polyamine is used herein as broadly inclusive of any of a variety of compounds containing at least two $NH_2$ groups. For example, these include hydrazine. The $NH_2$ group may be adjacent to a carbonyl group and such polyamines (formally, amides) may be employed as reactants in practicing the method of this invention. For example, useful reactants include urea, thiourea, O-tolyl biguanide and the like. Other such polyamines which may be employed in practicing this invention include 1,3-bis(2-aminoethyl)urea, carbodihydrazide, and so forth.

Still another class of active hydrogen polyfunctional monomers which can be used in practicing the method of this invention comprises the amino alcohols. By amino alcohols are meant alcohols containing reactive amine groups substituted by at least one hydrogen atom, preferably primary amino, and a hydroxyl function. Polyols containing tertiary nitrogen and even hindered secondary nitrogen will generally react essentially as hydroxy compounds, and thus nitrogen-containing polyols such as N-oleyl diethanolamine, mono(hydroxyethyl) tri(hydroxypropyl) ethylenediamine, 1-(2-hydroxypropyl)-3-(2-hydroxyethyl)-urea, 1,3-bis(2-hydroxyethyl)urea and the like are regarded for the present purposes as polyhydric alcohols.

Compounds classed as amino alcohols for the present purposes and useful in the practice of this invention are illustrated by ethanolamine, 3-aminopropanol, 3-aminobutanol, 4-aminobutanol, 2-hydroxy-2'-amino ethyl ether, the corresponding sulfide, and the like.

It is sometimes advantageous to reduce the activity of presently useful amines by quaternizing the nitrogen atom with an acid. References to amines as made herein are intended to include the corresponding acid salts. Preferably the acid employed for quaternization is one which will contribute to the energy content of the formulation, such as perchloric acid.

Proceeding now to a consideration of the second polyfunctional monomer, employed in the method of this invention to polymerize the active hydrogen polyfunctional monomer in the presence of dissolved lithium perchlorate, it is important that the reaction by which these monomers form a polymer is not one evolving water as a byproduct. Water hydrates the lithium perchlorate and this affects its solubility unfavorably. For the present purposes, in practicing the method of the invention, monomers will be chosen which form a condensation polymer without evolution of water.

A first and preferred class of such second polyfunctional monomers are those which form the presently provided products in which the polymer is characterized by complex amidic bonds. Especially preferred among such polyfunctional monomers are the polyisocyanates.

Illustrative examples of suitable polyisocyanates are tetramethylene diisocyanate, pentamethylene diisocyanate, hexamethylenediisocyanate, octamethylene diisocyanate, dodecamethylene diisocyanate, N-phenylene diisocyanate, tolylene-2,4-diisocyanate, tolylene-2,6-diisocyanate, 3,3'-bitolylene-4,4'-diisocyanate, naphthalene-1,5-diisocyanate, diphenylmethane-4,4'-diisocyanate and the like. It is preferable that the polyisocyanate contain less than about 20 carbon atoms.

As is known, reaction of a diisocyanate with a diol forms a polyurethane; reaction thereof with a diamine forms a polyurea; and reaction with an amino alcohol will form a polyurethane/polyurea. Each of these types of polymers includes complex amidic bonds in which the carbonamide group linking recurring units in the polymer chain is joined to a hetero atom which is O in the case of the urethane and N in the case of the urea bond.

An equivalent of the polyisocyanate, preferably used when the exotherm of the polymerization reaction with the isocyanate is unduly great, is a urethane made by reacting a polyisocyanate with a low molecular weight alcohol such as ethanol. The displacement of the alcohol group during polymerization releases the alcohol as a byproduct; this can be drawn off if desired (as by putting the reaction mixture under vacuum) or left in the polymer to serve as a plasticizer for the product. Illustrative of the urethanes which may be used for this purpose are those made by reacting an isocyanate such as those listed above with a low molecular weight alcohol such as ethanol, methanol, isopropanol and the like.

A second polyfunctional monomer which may be reacted with a diol, a diamine or amino alcohol to form the products comprising polymer having complex amidic bonds as provided by this invention are the bis-azlactones. These are cyclic compounds containing a

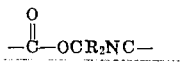

five-membered ring. The product of reaction with the polyfunctional active hydrogen monomer has a complex amidic bond which is a methylene dicarbonamide group

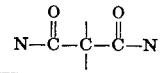

when an amine group combines with the azlactone residue and a methylene carbonamide carboxylate group

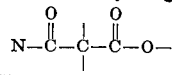

when a hydroxyl group is the reactant producing opening of the azlactone ring.

Illustrative of the presently useful azlactones are for example p-phenylene-bis(4,4-dimethyl-2-oxazolin-5-one), tolylene bis(4,4-dimethyl-2-oxazolin-5-one), cyclohexylene bis(4,4-dimethyl-2-oxazolin-5-one), phenylene bis(4,4-diethyl-2-oxazolin-5-one), ethylene bis(4,4-dimethyl-2-oxazolin-5-one), phenylene bis(2-oxazolin-5-one) and the like.

The present embodiment of the method of this invention is also adapted for the production of a number of other polymeric solid solutions, in addition to the above-discussed polymers having complex amidic groups.

Thus for example, a bis-lactone or bis-lactam can be reacted with a polyhydroxy alcohol, polyamine or amino alcohol to form polyesters and polyamides. The lactone or lactam ring opens so that the hetero atom of the ring picks up hydrogen from the active hydrogen polyfunctional monomer and forms a side chain, as may be understood from the illustrative equation

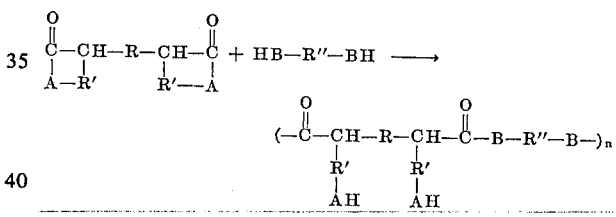

where A is O (lactone) or NH (lactam), B is O (hydroxyl) or NH (amine) and R, R' and R'' are organic radicals such as aliphatic and aromatic hydrocarbon radicals, for example.

Illustrative of lactones which may be employed thus in the method of this invention are, for example, ethylenebis-(butyrolactone), p-phenylenebis(butyrolactone), p-phenylenebis-(2-methylbutyrolactone) and the like.

Illustrative of cyclic bislactams which can be used in practicing the method of this invention are p-phenylenebis(2-pyrrolidinone), ethylene bis(pyrrolidinone), ethylenebis(3-methylpyrrolidinone) and so forth.

Another kind of polyfunctional compound which can be used to polymerize the active hydrogen monomer without evolution of water is a polyepoxy compound. These are reactive particularly with the polyamines (in fact, so much so that a secondary amine group may be preferable to a primary), but are known to react with polyhydric alcohol groups also, in a polymer-forming reaction. When condensed with a polyamine, the polyepoxy compounds react somewhat like the bislactones and bislactams discussed above: the epoxy ring opens to form a hydroxy-terminated side chain and the amine group, minus a hydrogen atom, forms the bond linking the repetitive units of the polymer.

Poly-$\beta$-hydroxyamines prepared from a diamine and a diepoxide offer several advantages as solid solution propellant binders. In contrast to a diisocyanate, the diepoxide dissolves some of the oxidizer so that it is not necessary to dissolve all of the oxidizer in the diamine monomer. In addition, the polymer itself is a more powerful solvent for the oxidizer than the two monomers so some of the oxidizer will dissolve during curing.

Also, it is found that the dissolved perchlorate has a beneficial activating effect on the hardening of the epoxy by the amine compound. The epoxy compounds are well known. The general characteristic of this class of materials is the presence of epoxy groups, which are of the formula

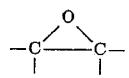

by the reaction of which the epoxy compound may be cured to give a solid, thermoset, resinous material. The poly epoxy compounds containing a plurality of terminal epoxy groups are frequently referred to as epoxy resins. Usually epoxy resins are of moderately high molecular weight, containing more than 10, and usually more than 20 carbon atoms per molecule.

Epoxy groups can be introduced into organic molecules, particularly cyclic organic compounds, by treatment of an aliphatic double bond with an appropriate oxidizing agent, or by reaction of a polyfunctional epoxy compound with a polyol, that is, a compound containing two or more hydroxy radicals, producing epoxy resins comprising one or more ether linkages joining organic radicals and terminating in epoxy groups.

One class of epoxy compounds useful in the process of this invention are the product of reaction of a polyfunctional epoxy compound with an aromatic polyhydric phenolic compound. The polyfunctional epoxy compound used in this connection may be a diepoxide, distinguished from the class of epoxy resins by its relatively low molecular weight, illustrative of which are diepoxybutadiene, bis(2,3-epoxy-2-methylpropyl) ether and the like. More usually, the polyfunctional epoxy compound is a haloepoxy compound, most commonly, epichlorohydrin. Reaction of epichlorohydrin, for example, with an aromatic polyhydric phenolic compound results in the formation of a polymer containing ether linkages between arylene radicals derived from the initial aromatic polyhydric compound and hydroxy-alkylene radicals derived from the initial haloepoxy compound, the polymers terminating in epoxyalkoxy radicals. The aromatic polyhydric compound may comprise a monocyclic phenol such as a resorcinol, a polycyclic phenol such as p,p'-(dihydroxy)-biphenyl, a phenolic resin such as a phenol-formaldehyde resin, a bisphenol and the like.

Illustrative of bisphenols which may be employed to produce such polyepoxides are, for example, p,p'-oxybisphenol, p,p'-methylenebisphenol, 2,2-bis(4-hydroxyphenyl)propane, 2,2-bis(4-hydroxy-2-methylphenyl)propane, 2,2-bis(2-t-butyl-4-hydroxyphenyl)propane, 2,2-bis(2,5-dimethyl-4-hydroxyphenyl)-propane, 2,2-bis(2-chloro-4-hydroxyphenyl)propane, 2,2-bis-(2-bromo-6-fluoro-4-hydroxyphenyl)propane, 1,1-bis(4-hydroxyphenyl)ethane, 1,1-bis(4-hydroxyphenyl)isobutane, 1,1-bis-(2-isopropyl-4-hydroxyphenyl)isobutane, 2,2-bis(4-hydroxyphenyl)-butane, 4,4-bis(4-hydroxyphenyl)heptane, 1,1-bis(4-hydroxyphenyl)dodecane, 2,2-bis(4-hydroxyphenyl)hexadecane, and the like.

Another class of epoxy resins commercially available and useful in the present process comprises aliphatic epoxy resins. Compounds of this nature may, for example, be prepared by a process analogous to that employed in preparing an epoxy resin from a bisphenol, with the substitution of an aliphatic polyol for the aromatic hydroxy compound. As illustrative of epoxy resins of this class may be mentioned reaction products of an epoxy group source such as epichlorohydrin with aliphatic polyols such as triethylene glycol, 1,4-butylene glycol, hexamethylene glycol, octaethylene glycol, glycerol, sorbitol and the like. A compound of this nature may be represented by the formula

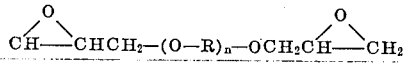

where R is an aliphatic group containing only C, H and O, and n is an integer, including zero.

In general, aliphatic chains produce more flexible resins than aromatic, and mixed aliphatic and aromatic chains may alternatively be introduced into an epoxy resin, using the aforedescribed procedures, producing resins of modified properties.

As mentioned above, epoxidized cycloaliphatic compounds such as a diepoxide of ethylene glycol bisdihydrodicyclopentadienyl ether, are also comprised within the class of epoxy resins curable to thermoset resinous products. These, and particularly the stated diepoxide, are a preferred class of epoxy resins for use in the practice of the present invention. Illustrative of other useful epoxidized cycloaliphatic resins are, for example, limonene diepoxide, dicyclopentadiene diepoxide, vinylcyclohexene diepoxide, 3,4-epoxy-6-methylcyclohexylmethyl 3,4-epoxy-6-methyl-cyclohexanecarboxylate, and the like.

Other feasible variations in epoxy resin structure will be known to the art. This invention contemplates the use of any of the variety of epoxy resins conventionally used in the industry for the production of resinous materials by curing processes.

It is frequently advantageous to employ hardeners in the epoxy systems, which lead to cross-linking of the polymer chains and consequent higher molecular weight. One method of accomplishing this is to include trifunctional monomers in the system. Thus for example, part of the diamine component may be replaced by a triamine such as diethylenetriamine, dipropylenetriamine, and the like. Another method of hardening the resin is to provide cross-linking through the hydroxy groups formed by ring opening of the epoxy groups. This may be effected, for example, by treatment with a polycarboxylic acid compound, which will esterify these hydroxy groups. Preferably an acid compound is used which will release a minimal amount of water on esterification, such as pyromellitic dianhydride, or maleic anhydride, fumaric anhydride, succinic anhydride and the like.

The polymerization method of this embodiment will comprise contacting the active hydrogen polyfunctional monomer with the polyfunctional monomer reactive therewith in the presence of an oxidant amount of dissolved perchlorate. In general, the polymerization will be conducted by dissolving the perchlorate eutectic in one or both of the reactants, and then contacting them under conditions adapted to effect their reaction to form a polymer.

Usually the amounts of the respective monomers will be proportioned to one another to supply one equivalent of the active hydrogen polyfunctional monomer per about one equivalent of the second monomer reactive therewith. By an equivalent is meant a mole divided by the number of functional groups in the monomer. Thus one mole of the active hydrogen monomer will be employed per mole of the second monomer reactive therewith where each are difunctional; where the active hydrogen monomer is tetrafunctional, one-half mole of this will supply an equivalent per mole of a difunctional second monomer reactive therewith, and so forth. Sometimes a slight excess of one or the other will advantageously be employed, to facilitate completion of the reaction.

Thus for example, the polymerization of a dihydric alcohol and a diisocyanate is effected by preferably employing a slight molar excess of the diisocyanate sufficient to react with all of the hydroxyl groups, such as about 1.05 mole equivalents of diisocyanate per mole of a dihydric compound.

In general, polymerization may be effected at temperatures ranging from 0° C and below up to any temperature below the decomposition temperatures of reaction mixture components. The polymerization of presently employed reactants to provide the condensation polymers can be accelerated by the application of heat, but in general the system should not be held at temperatures in excess of about 200° C to preclude the dissociation of the polymer and the possible hazard of effecting an explosive oxidation of the system. Normally polymerization temperatures below about 150° C will be sufficient for most reactants selected.

Usually polymerization is effected simply by maintaining the monomers, in the presence of dissolved perchlorate, in contact with one another at suitable temperatures. If desired variation of pressure from atmospheric — for example, down to 0.1 mm Hg or up to 5,000 psi — may be employed. Solvents and diluents, such as plasticizers and the like, discussed in more detail below, may be present. It is sometimes advantageous to employ a catalyst in connection with the practice of the present invention, to promote condensation of the monomers. Thus for example in reacting trimethylene diamine with hexamethylene diisocyanate to form a polyurea, ferric acetyl acetonate and similar coordination compounds of transition metals are useful as catalysts. The polymerization of a polyhydric compound with a diisocyanate can be favored by the presence of a base catalyst, as for example a tertiary amine such as triethylamine, N,N-diethylcyclohexylamine, N-methylmorpholine, pyridine and other base catalysts.

To provide a dense, substantially homogeneous polymer composition it is necessary to preclude the presence of agents in the polymerization system which would cause foam formation therein. Accordingly, where an isocyanate is employed as a reactant, the system should be maintained free from water. Also proper mixing means should be employed to preclude trapping air in the final polymer composition.

A third group of monomer systems which may be converted to polymeric solid solutions by polymerization in the presence of the perchlorate eutectic consists of self-condensing monomers which polymerize without evolution of water. There are various types of polymerizable monomers within this category. Thus for example, such monomers include the cyclic lactams of amino acids such as ε-caprolactam, 2-pyrrolidinone and the like. These can be polymerized in the presence of dissolved perchlorate for example by known low temperature, base-catalyzed N,N-diacylinitiated polymerization processes. Illustrative of such polymerization catalysts is a system comprising a catalytic amount of a dispersion of sodium hydride in mineral oil combined with N-acetyl caprolactam, a combination of N-acetyl caprolactam and phenyl magnesium bromide, and the like. Generally the base catalyst in the system, which is an alkyl or alkaline metal or its hydride, borohydride, or like active derivative is employed in an amount of about 0.05 percent up to about 5 percent and preferably 0.1 percent up to about 1 percent by weight of the lactam present in the composition, and the N,N-diacyl catalytic promoter is employed in conjunction therewith in an amount varying from about 0.1 to about 5 mole per cent and preferably 0.1 to 1 mole per cent of lactam monomer.

Another kind of self-condensing monomer which yields polymer without evolution of water as contemplated herein is a polyisocyanate. Heating a polyisocyanate in the presence of a catalyst of ionic polymerization forms a polyisocyanurate. The isocyanurate ring, which contains 3 N and 3 CO units symmetrically arranged, is the residue of one and a half diisocyanate monomer molecules. The polyisocyanurate can be made from a diisocyanate, or from the combination of a diisocyanate with a monoisocyanate. The latter combination promotes linearity of the polymer chain. Illustrative diisocyanates which may be employed in this connection include the diisocyanates listed above. Illustrative monoisocyanates are the corresponding aromatic and aliphatic isocyanates such as phenyl isocyanate, chlorophenyl isocyanate, methoxyphenyl isocyanate, n-hexyl isocyanate, and the like. The monoisocyanate may be present in any amount relative to the diisocyanate. About 40 mole percent to 100 mole percent of monoisocyanate based on diisocyanate is generally useful.

The polymerization reaction is conducted in liquid phase in the presence of a suitable solvent. To be effective for the present purposes, the solvent will be one in which the monomeric isocyanate is miscible or soluble and further, one in which the perchlorate eutectic is sufficiently soluble for the present purposes. Generally, an oxidant amount of perchlorate must be soluble in the amount of solvent employed. This amount may vary over wide limits for the purposes of the present invention. Generally about 2 to 20, and preferably about 8 to 10 parts by weight of solvent per part of monomer starting material are employed. As will be appreciated, an isocyanate functional group is reactive with active hydrogen, such as the active hydrogen of alcohols and of amines. Therefore, to avoid diversion of the isocyanate to reaction with such materials, the solvent chosen should be characterized by substantial inertness towards the isocyanate radical. Solvents having on the one hand inertness towards isocyanate groups and on the other hand solvent power for the perchlorate include as a particularly preferred class the amides in which the nitrogen atom is fully substituted. Especially preferred in this connection for use in practicing the present invention are for example, N-dialkyl alkanecarbonamides such as dimethylformamide, dimethylacetamide, dibutylacetamide, diethylformamide, and the like. Similarly highly polar solvents free of reactive hydrogen such as dimethylsulfoxide can also be employed in this connection.

The polymerization reaction is catalyzed by means of a catalyst which induces ionic polymerization and may include a strong base of an organic or inorganic type as long as it does not affect adversely to any significant extent the desired product materials. The strong bases include, for example, tertiary amines, which may be alkyl, or heterocyclic, such as triethylamine, pyridine, 1,4-diazabicyclo[2.2.2]octane, and the like; alkali or alkaline earth metal salts of low molecular weight carboxylic acids such as sodium carbonate, sodium acetate, potassium acetate, and the like; alkali metal alkoxides, such as sodium methoxide and potassium propoxide; organic tertiary phosphines such as triethylphosphine, dimethylphenyl phosphine, and so forth The quantity of catalyst employed for the reaction may vary over wide limits, but in general about 1 to 50 mole percent, preferably about 1 to 5 mole percent of a strong base catalyst, such as the bicyclo compounds, or about 20 to 50 mole percent of a weak base catalyst such as triethylamine, based on monomer starting material, may be employed.

The catalysis of the polymerization reaction may be enhanced by the additional use of an organic epoxide. The organic epoxide is miscible and/or soluble with the diisocyanate monomer. The useful epoxides include aromatic and aliphatic compounds including, for example, epihalohydrins, such as epichlorohydrin; alkylene oxides such as propylene oxide and styrene oxide; alkenyl oxides such as butadiene mono- or dioxide, glycidyl esters such as ethyl glycidate, and so forth. Generally the presence of the epoxy group enhances catalysis, and the compound thereof is wholly or partly miscible or soluble with the monomer. The amount of organic epoxide employed with the ionic polymerization catalyst may vary considerably, but in general up to 100 mole percent, preferably about 5 to 10 mole percent of organic epoxide when using a strong base catalyst such as the bicyclo compounds, or preferably about 20 to 50 mole percent of organic epoxide when using a weak base catalyst such as triethylamine, may be used.

The polymerization temperature may vary from about ambient level to about 125° C with the upper limit being determined by the fact that adverse effects tend to become noticeable above the same. Preferably, it is about 75°–100° C. However, in some instances temperatures above 125° C may be used. The temperature of reaction may vary with pressure, and atmospheric pressure is contemplated for the temperature range given above. If desired, the reaction may be conducted at subatmospheric or superatmospheric pressure, in which case the temperature may be varied outside the range herein given. The time required for the polymerization reaction to be substantially completed may vary considerably depending upon the type of monomer employed and may take for example, up to about 2 hours for substantial completion. The time of reaction is only important as far as the quantity of polymer is concerned. If desired, the reaction time may be shortened to suit the particular needs of a situation or for that matter lengthened, without departing from the scope of the present invention.

When the products of the invention are prepared by a method as described above, after polymerization is complete, it is sometimes advantageous to maintain the polymerized mass at temperatures above ambient temperature for a time, to effect complete cure or postcure of the mass.

While the above discussion refers to the method of polymerization in the presence of dissolved perchlorate eutectic, it is to be appreciated that this is not the exclusive method by which products as claimed herein may be produced. The scope of the present invention extends to polymeric solid solutions of the perchlorate eutectic prepared by forming the polymeric chain first and afterwards dissolving the perchlorate eutectic in the polymer. This can be done simply by heating and working the polymer in the presence of the perchlorate eutectic until it is fluid, as for example by blending it with the perchlorate in suitable mixers or extruders or on a roll mill or the like, at temperatures up to about 250° C, desirably but not necessarily in the presence of a solvent or diluent, which preferably will be a polymer plasticizer such as di-n-butyl phthalate.

The stated method of incorporating the perchlorate eutectic into polymer in solid solution therein is desirable in instances where the polymer-forming reaction proceeds with evolution of water. Thus for example, polyamides may be formed by heating a dicarboxylic acid or acid anhydride with a diamine. The polymer chain is formed with accompanying evolution of water. This would be deleterious to the solubility of the eutectic. But if the polymer is formed first, the perchlorate eutectic can later be incorporated in it without difficulty.

Illustrative of condensation polymers which may be advantageously formed separately and subsequently combined with the eutectic to form the polymeric solid solutions of the invention are polyesters and polyamides. Thus for example, a polyester may be obtained by condensing a diol such as ethylene glycol with a carboxylic acid such as adipic acid, either in the presence or the absence of modifiers such as maleic anhydride and styrene. Polyamides may be formed by condensing an acid such as adipic or succinic acid with polyamine such as trimethylene diamine or hexamethylene diamine. These and other methods of forming a polymer suitably adapted for the present purposes are well known to the art. Any polymer containing a donor atom such as O, S, or N in repeating units of the chain may be employed for this purpose.

However, the method of polymerizing in the presence of dissolved perchlorate eutectic, where applicable, is usually preferable.

As the foregoing has indicated, compositions provided in accordance with this invention may consist essentially of a polymer of the kind stated above, and the perchlorate in solid solution therein. Such compositions are useful as fuels and monopropellants: they will burn to form energetic gases or, if confined, burn explosively.

Desirably, however, additional components will be present in compositions embodying the present invention. Components which are particularly desirably present in such compositions comprise polymer-modifying additives such as plasticizers, and in this connection it has been found that unexpectedly large increases in solvent power can be achieved by selection of appropriate plasticizers.

Additives which can advantageously be incorporated in the compositions of this invention comprising homogeneous mixtures of polymer and the perchlorate eutectic are the relatively low molecular weight plasticizers. One exemplary class of these are amides. These include, for example, the sulfonamides such as N-monosubstituted toluene sulfonamides such as N-ethyl-p-toluenesulfonamide, N-ethyl-o-toluenesulfonamide, and mixtures thereof. Further it includes amides and hydrazides such as formamide, dimethylformamide, hydrazodicarbonamide and oxaldihydrazide.

Another group of useful plasticizers are glycol ethers such as triethylene glycol dimethyl ether, ethylene glycol, glycerol and the like. In this group, ethylene glycol is found to exert a particularly favorable effect, used both alone and in combination with other plasticizers in the binder compositions.

Another class of presently useful plasticizers are those which are better fuels than the ethylene glycol type. Such plasticizers having good fuel properties are characterized by the presence of nitro groups. Illustrative of such compounds are 5,5-dinitro-1,2-hexanediol, bis(2,2-dinitropropyl)formal, 5,5-dinitro-1,3-dioxane, tris(hydroxymethyl)nitro methane, and the like.

The fairly polar plasticizers preferably should also be solvents for the perchlorate such that components of the system are mutually soluble or dispersible to effect a homogeneous solid composition. The presence of the plasticizers may render the composition more rubbery and provide a material improvement in tensile elongation of the material.

The plasticizer employed will function as a fuel element in the composite solid propellant, and the ratio of perchlorate should be adjusted so that a proper balance is maintained between the oxidant and the fuel combinations to provide complete combustion.

The amount of plasticizer employed can vary up to about 35 weight per cent of the polymer present in the composition but amounts of from about 15 to about 25 weight per cent are generally preferred.

Also, the novel homogeneous, single-phase combinations of perchlorate with polymers provided by this invention can advantageously contain metal and hydride fuels. Thus for example, the propellant compositions may contain finely divided light metals and various hydrides thereof. Examples of these are beryllium, boron, magnesium, aluminum, magnesium hydride, aluminum hydride, the various solid hydrides, such as decaborane, alkylated decaboranes (ethyl alkylated decaborane), aluminum borohydride, lithium aluminum hydride, and the like. For example, the homogeneous mixture of the perchlorate eutectic and the polymer may contain up to about 20 percent by weight of the total composition of atomized aluminum (particle size about 20 microns). Preferably the aforesaid fuel material should be sufficiently fine to all pass a standard 100 mesh screen, and more preferably should pass a 200 mesh screen.

These light metal hydride energy additives should preferably not exceed about 25 weight per cent of the total composition, since the heavy combustion exhaust tends to lower performance of the solid propellant composition. It is often desirable to incorporate not more than from 5 to about 10 weight per cent of said additives based on the total weight of the propellant composition.

Another group of additives which may be included in the system as part of the solids phase comprises oxidants, and other readily decomposable materials such as explosives. Illustrative of useful oxidants are, for example, ammonium perchlorate, ammonium nitrate and the like. Illustrative of useful explosive components are, for example, sodium azide.

The amount of oxidant employed in the solids phase will be adjusted in accordance with the amount of fuel to be burned in the composition and the amount of dissolved oxidant already supplied by the binder. Energetic, gas-supplying decomposable materials not requiring oxidant will usually be employed in gas-deficient systems, and the amount thereof adjusted to supply gas volume sufficient to take up thermal energy available so as to maximize the specific impulse of the system.

Referring to use of the presently provided compositions, when these are polymerization cast directly in a rocket motor, they will generally exhibit adhesive properties, and thereby adhere in polymerization to the cylinder in which they are cast. Due to this adhesive quality, it may be desirable for a core insert to be employed to provide the desired internal cavity to effect proper radial burning of the propellant composition. This may be fabricated from or coated with a material such as polyethylene or polytetrafluoroethylene in order to provide ready release of the insert when polymeriaztion is terminated.

The solid propellant may also be produced by extrusion for insertion in small bore rocket cases. In this case, a small amount of catalyzed liquid polymer composition can first be added to the cylinder case such that the insertion of the extruded mass will displace the liquid polymer, forcing it to rise in the annular space between the extrusion mass and the cylinder wall, whereby the inserted mass is securely bonded within the case. This liquid polymer can be of similar composition to the propellant composition insert, or any other suitable polymer composition which can be readily cured at suitable temperatures, below about 200° C, such as, for example, epoxy resins, polysulfide rubbers and the like.

The perchlorate polymeric compositions of this invention burn vigorously and relatively uniformly when ignited and are useful as a solid propellant for rockets including short range ballistic weapons such as aircraft and artillery rockets and long range strategic missiles, wherein they may be the sole propellant or be employed in one or more stage of a multistage rocket system. The aforesaid compositions are also useful for rocket assisted takeoff, as boosters, sustainers and as pyrotechnics. When confined the aforesaid compositions also are particularly valuable as explosives.

The invention is illustrated but not limited by the following examples in which all parts are by weight unless otherwise noted.

EXAMPLE 1

This example illustrates preparation of lithium perchlorate/hydrazine perchlorate eutectics by fusion technique.

The mixes of the anhydrous perchlorates used for preparation of the eutectics have the following compositions:

| 1:1 Eutectic | Parts | Weight % | Mole % |
|---|---|---|---|
| $LiClO_4$ | 178 | 44.5 | 50 |
| $N_2H_5ClO_4$ | 222 | 55.5 | 50 |
| 1:2 Eutectic | | | |
| $LiClO_4$ | 246 | 61.6 | 66.1 |
| $N_2H_5ClO_4$ | 154 | 38.4 | 33.9 |

Each of the mixes is fused by heating to 180° C. They form clear melts, with a large decrease in volume. After solidification, the eutectics are dense solids, each melting substantially below the melting point of hydrazine perchlorate.

EXAMPLE 2

This example illustrates preparation of the 1:1 molar ratio eutectic by the solution technique.

Lithium perchlorate is dried for 2 hours at 120° C under a subatmospheric pressure of 0.5–1 mm from solution.

A mixture of 31.75 g of barium perchlorate in 150 ml of isopropanol and 12.95 g of hydrazine monochloride in 300 ml isopropanol is stirred vigorously while it is heated. After 4 hours stirring at 50°-60° C, the precipitated barium chloride is separated by centrifuging and washed twice with about 100 ml each time of isopropanol, with stirring and heating during the washing. 20 g of lithium perchlorate are added to the combined filtrate and wash liquors and the resulting solution is evaporated to dryness in the rotary evaporator at 60° C under reduced pressure corresponding to about 0.5 mm Hg. After drying for 1 hour at 60° C and 0.5 mm Hg, the eutectic has an impact sensitivity of 27.0 cm (50 percent probability).

EXAMPLE 3

This example illustrates preparation of a polymeric solid solution composition comprising a polymeric binder and hydrazine perchlorate/lithium perchlorate eutectic.

The 1:1 hydrazine perchlorate lithium perchlorate eutectic is dissolved in acrylamide to the limit of solubility at room temperature. While the solution of the perchlorate eutectic in the olefin is held at 25°–30° C, 0.05 percent, by weight of the reaction mixture, of cumene hydroperoxide is added. The acrylamide is completely polymerized in ten minutes, and the product is a polymeric solid solution of the eutectic.

EXAMPLE 4

This example illustrates another embodiment of a composition provided in accordance with this invention by an addition polymerization of an olefinic monomer in the presence of dissolved hydrazine perchlorate/lithium perchlorate eutectic (1:1 molar ratio).

The mixture is prepared of acrylamide and ethylene glycol in a ratio of 10 parts acrylamide to 4 parts of the glycol. The glycol functions as a plasticizer in the polymeric binder and also raises the solubility of the mixture for the perchlorate eutectic: 14 parts by weight of the acrylamide and glycol 10:4 mixture will dissolve 58 parts by weight of hydrazine perchlorate/lithium perchlorate eutectic. To this mixture is added 22 parts by weight of 5 micron atomized aluminum and 6 parts tetramethyl ammonium perchlorate.

Tetramethyl ammonium perchlorate is a gas-forming fuel useful in compositions such as the present composition, containing so little binder that it would otherwise be gas-deficient with respect to taking advantage of the thermal energy which can be supplied by oxidation of the aluminum fuel. The tetramethyl ammonium perchlorate can be prepared by adding a stoichiometric amount of silver perchlorate to an aqueous solution of tetramethyl ammonium chloride. After removal of the precipitated silver chloride, the salt is isolated from the aqueous solution by chilling or evaporating it to dryness. The product perchlorate is a white, highly crystalline nonhygroscopic solid which neither melts nor decomposes on slow heating up to 350° C. A purified sample has an impact sensitivity of 30–40 cm (50 percent probability, 2 kg weight) and a measured density of 1.4 g/cc.

The mixture of the olefinic monomer and glycol, perchlorates and aluminum is held at 85° C while a catalytic amount of cumene hydroperoxide is added to catalyze polymerization of the acrylamide. The mixture can be shaped and cast immediately after addition of the catalyst. Desirably, the composition is maintained at an elevated temperature such as 75°–80° C over a period of time after polymerization has occurred to complete the cure. For example, a sample of this composition cured at 75° C for 70 hours has an ultimate strength of 71 psi and ultimate tensile elongation of 116 percent.

Combustion of the stated composition is smooth and reproducible even at 1,000 psi in spite of a fast burning rate and high pressure component. Ignition is easy at all pressures.

The product has remarkably good mechanical properties for its very high inorganic loading, which amounts to 86 percent inorganics. Its properties as a propellant are also outstanding as shown by the following data:

| | |
|---|---|
| Specific Impulse (computed): | 260 lb-sec/lb |
| Effective Specific Impulse (computed): | 255 |
| Density (theoretical): | 1.919 g/cc (0.0693 lb/in³) |
| Ultimate Tensile Strength, psi (73°F): | 40–70 |
| Modulus (2% Secant) psi: | 100–200 |
| Strand Burning Rate (5μ Aluminum): | 1.27 in./sec at 1000 psi |
| Pressure Exponent of Burning: | 0.75 |
| Impact Sensitivity (50% probability, 2 Kg Weight) | 15.4 cm |

EXAMPLE 5

This example illustrates preparation of polymeric solid solutions of the hydrazine perchlorate/lithium perchlorate eutectics in polymers prepared by polymerizing a first active hydrogen polyfunctional monomer with a second polyfunctional monomer reactive therewith to form a polymer.

The solubility of the hydrazine perchlorate eutectics is measured at 85° C in active hydrogen polyfunctional monomers. The solubilities are exceptionally high, as shown by the following data, given in terms of per cent of its own weight which the listed monomers dissolve:

| Solvent | Hydrazine perchlorate/ lithium perchlorate (1:1 mole ratio) | Hydrazine perchlorate/ lithium perchlorate (1:2 mole ratio) |
|---|---|---|
| Trimethylenediamine | at least 3000% | at least 2300% |
| Trimethylenediamine perchlorate | 3000% | at least 2300% |
| Ethylene glycol | <300% | 2300% |
| Ethanolamine | 3500% | 2500% |
| Diethanolamine | 1500% | 2100% |
| Triethanolamine | 1500% | 1900% |

| | | |
|---|---|---|
| Ethylene glycol/ Trimethylenediamine 60–40 weight ratio mixture | 1700% | 2500% |

In an illustrative procedure, a poly-beta hydroxy amine is prepared by dissolving hydrazine perchlorate/lithium perchlorate eutectic in N,N'-dimethylhexamethylene diamine and adding the stoichiometric amount of a polyepoxy compound which is the diglycidyl ether of 2,2-bis(4-hydroxyphenyl)propane and maintaining the reaction mixture overnight at 85° C.

Another illustrative preparation of a solid solution composition is conducted as follows. The 1:1 molar ratio perchlorate eutectic is dissolved in N,N'-dimethylhexamethylene diamine, and this diamine is reacted with the stoichiometric amount of menthane diisocyanate in the presence of bis(2,2-dinitropropyl)acetal as a plasticizer and 5 micron particle size aluminum as a thermal fuel, to provide a propellant composition with a polyurea binder of the following composition:

| | |
|---|---|
| Binder | 12.28% by weight |
| Plasticizer | 9.70% |
| $N_2H_5ClO_4$/$LiClO_4$ | 56.67% |
| Aluminum | 21.35% |

The reaction mixture has a viscosity of slightly over 100,000 centipoises at 80° C. A high vacuum is employed during the mixing. The curing reaction is sufficiently slow that the propellant has a pot life of at least 1.5 hours at 85° C and reaction exotherm is not excessive. The propellant is cured at 75° C or less. The computed specific impulse is 262 lb/sec per lb. The ultimate tensile strength at 73° F is 170 psi.

While the invention has been illustrated with reference to various specific preferred embodiments thereof, it is to be appreciated that variations are possible within the scope of the invention, which is limited only as described in the appended claims.

What is claimed is:

1. A hydrazine perchlorate/lithium perchlorate eutectic, having a molar ratio of hydrazine perchlorate to lithium perchlorate selected from 1:1 and 1:2

2. The 1:1 molar ratio hydrazine perchlorate/lithium perchlorate eutectic.

3. The 1:2 molar ratio hydrazine perchlorate/lithium perchlorate eutectic.

* * * * *